United States Patent [19]

Lyman et al.

[11] Patent Number: 4,683,058
[45] Date of Patent: Jul. 28, 1987

[54] FILTER FOR CENTRIFUGE TUBE

[75] Inventors: George F. Lyman, Cape Porpoise, Me.; Gregory Mathus, Concord, Mass.

[73] Assignee: Costar Corporation, Cambridge, Mass.

[21] Appl. No.: 841,583

[22] Filed: Mar. 20, 1986

[51] Int. Cl.[4] ...................... B01D 21/36; B01D 33/00
[52] U.S. Cl. .................................... 210/359; 210/515; 210/518; 210/927; 422/100
[58] Field of Search ............... 210/927, 359, 515, 518, 210/DIG. 24, 446; 422/100

[56] References Cited

U.S. PATENT DOCUMENTS 4,436,631  3/1984  Graham et al. ...................... 210/927
4,522,713  6/1985  Nussbaumer et al. ............... 210/927

Primary Examiner—Frank Sever
Attorney, Agent, or Firm—Wolf, Greenfield & Sacks

[57] ABSTRACT

A filter for a centrifuge tube including a pressure filter for separating a mixture under centrifugal force. The filter tube is adapted to fit within the upper portion of a standard plastic centrifuge tube. The filter tube has a pressure filter at its lower end and an opening at its upper end adapted to be sealed by a cap extending from the centrifuge tube to hold the filter tube securely in position within the centrifuge tube. The filter tube is filled with a mixture of permeable and non-permeable materials and when the composite centrifuge tube and filter tube is spun in the centrifuge, the centrifugal force causes the permeable materials to flow through the filter and collect in the bottom of the centrifuge tube while the non-permeable materials are retained in the filter tube.

14 Claims, 6 Drawing Figures

4,683,058

FILTER FOR CENTRIFUGE TUBE

BACKGROUND OF THE INVENTION

This invention relates to a pressure filter insertable in a centrifuge tube for filtering by means of centrifugal force.

A standard one-piece centrifuge tube which is commercially available for separating millileter/microliter liquid samples consists of a plastic tube having a closed conical-shaped bottom and an open top, a cap for releasably sealing the open top, and a flexible connecting member extending between the tube and cap. In use, the centrifuge tube is filled with a mixture or suspension of materials of closely similar densities and placed in a complimentary-shaped slot of a centrifuge tube holder. By spinning the tube in the centrifuge, the application of centrifugal force causes the mixture of materials to separate by specific density. The centrifuge chamber may revolve at speeds of 10,000 rpm or more to impart a force up to 17,000 times that gravity. The smaller the difference in density, the greater is the force required for separation. Because the tubes are held at an angle in the tube holder, with the lower end of the tube further from the center line of the chamber than the upper end, the materials of higher density collect in the lower portion of the tube while those of lower density are concentrated at or near the upper portion of the tube. This technique is used effectively in a number of biological and industrial operations, such as separation of the components of blood.

Filtration involves the separation of solutes and particles larger than a specified filter "cut of" from the solvent and smaller molecules which pass through the filter. A pressure filter requires the application of force to cause liquid to flow through the filter. Typically such force is provided by ejecting the liquid through a syringe or by applying a vacuum. Filtration is also used effectively in a number of biological and industrial operations.

It is an object of the present invention to provide a pressure filter which is insertable within a centrifuge tube for filtering materials by means of centrifugal force.

It is another object of this invention to provide a filter tube for use with a standard centrifuge tube having a cap wherein the filter tube is insertable into an upper portion of the centrifuge tube and is sealed and held in place in the centrifuge tube by the cap.

SUMMARY OF THE INVENTION

The filter tube of this invention is intended to be placed in a centrifuge tube so that the composite can be spun in a centrifuge. The centrifugal force will cause a mixture of permeable and non-permeable materials placed in the filter tube to be separated by filtration with the non-permeable materials remaining in the filter tube and the permeable materials being collected in the centrifuge tube.

The filter tube is adapted to be used with a cylindrical centrifuge tube of a first length which is closed at a lower end and open at an upper end and including an upper portion adjacent the upper end and the lower portion adjacent the lower end. The centrifuge tube further includes a flexible connecting member of a predetermined length and a cap, with the connecting member being attached at one end to the centrifuge tube and at the other end to the cap.

The cylindrical filter tube is of a second length less than the first length and is adapted to be fit in axial alignment within the upper portion of the centrifuge tube. Means are provided for positioning the filter tube in a predetermined position within the upper portion of the centrifuge tube. An opening at the upper end of the filter tube is adapted to be sealed by the cap with the connecting member securing the filter tube in the predetermined position in the upper portion of the centrifuge tube.

A filter support means is disposed at a lower end of the filter tube. A pressure filter is retained in the lower end of the filter tube by the filter support means. Vent means are provided for allowing air to escape from the centrifuge tube as the permeable material passes through the filter. A predetermined amount of a mixture of permeable and non-permeable materials placed in the filter tube will be separated when the composite centrifuge tube and filter tube are spun in a centrifuge such that the non-permeable materials are retained in the filter tube and the permeable materials which pass through the pressure filter are collected in the lower portion of the centrifuge tube.

In a preferred embodiment, the entire filter tube and the centrifuge tube are both made of plastic. Further, the preferred means for positioning the filter tube consists of a cylindrical flange on the upper end of the filter tube having a diameter larger than the internal diameter of the centrifuge tube so the flange rests upon the upper end of the centrifuge tube. A pair of projecting ears extend from the flange for grasping the filter tube.

A preferred filter support means consists of an array of spaced perpendicularly disposed bars, and more particularly, to two parallel spaced arrays of bars which are perpendicularly disposed one above the other. The pressure filter is disposed in the filter tube on top of the filter support means. The bottom of the filter tube includes a peripheral shoulder to which the periphery of the pressure filter is sealed to prevent liquid from escaping around the edges of the pressure filter. The filter tube and pressure filter are preferably both made of plastic so that the periphery of the pressure filter can be heat sealed to the filter tube. It is also preferred to provide a shallow conical-shaped bottom on the filter tube to promote the flow of permeable material through the filter.

DETAILED DESCRIPTION OF A PREFERRED EMBODIMENT OF THE INVENTION

Figure 1:
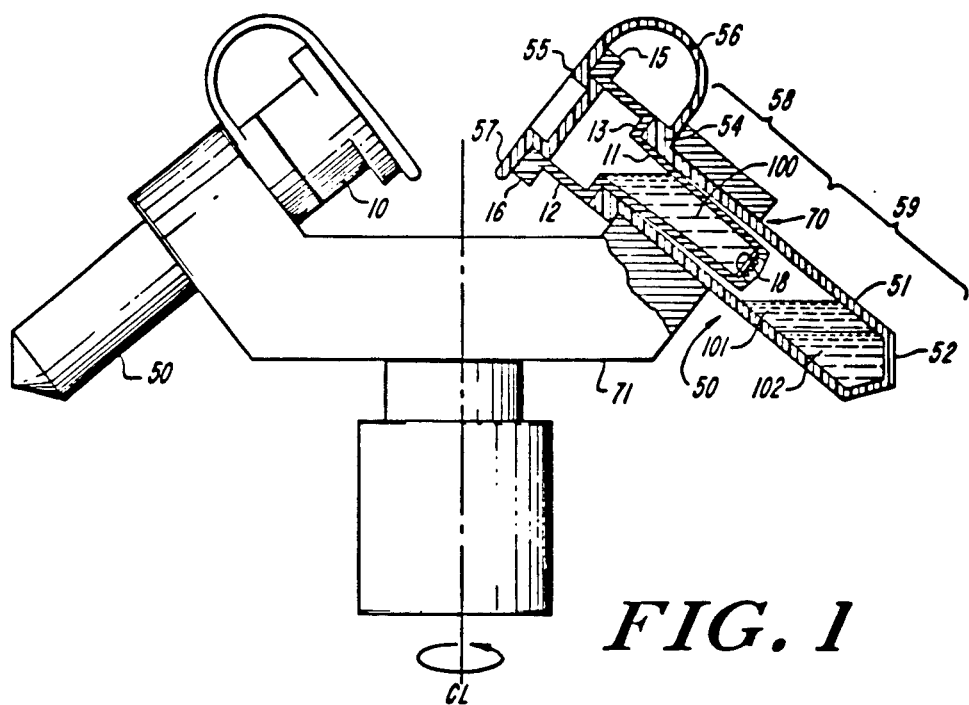
FIG. 1 is a schematic side view, in partial cross section, of the filter tube of this invention inserted within a centrifuge tube and positioned in a centrifuge tube holder.
Figure 2:
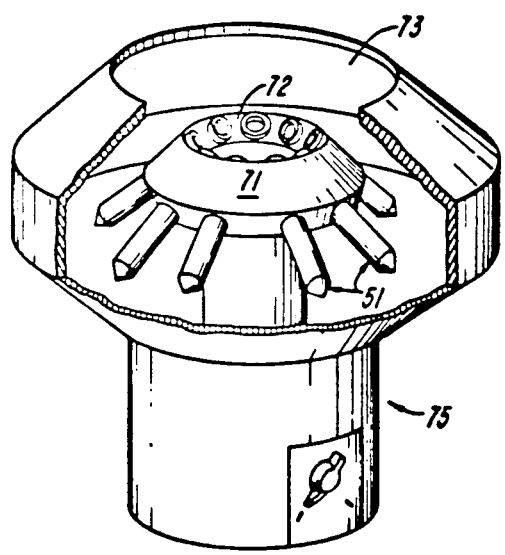
FIG. 2 is a schematic, partial cut-away view of a centrifuge showing a plurality of centrifuge tubes disposed in the tube holder.

The filter tube 10 of this invention is shown in FIG. 1 disposed within a standard centrifuge tube 50. The standard centrifuge tube is an integral body made of plastic, such as polypropylene, including a cylindrical tube portion 51 having a first length, a conical-shaped closed bottom 52, an open upper tube end 53, a peripheral flange 54 at the upper end, a cap 55, and a flexible connecting member 56 extending between the flange 54 and cap 55. The centrifuge tube 50 is adapted to fit within a complimentary-shaped slot 70 in a centrifuge tube holder 71 with the flange 54 resting on the upper surface 72 of the tube holder, as shown in FIG. 2. The centrifuge tube is disposed diagonally in the tube holder within the centrifuge chamber 73 at an angle of less than 90° from vertical with the lower end of the centrifuge tube extending away from the center line CL of the tube holder. When the tube holder and centrifuge tubes are spun within the centrifuge chamber, the materials within each centrifuge tube are separated by means of specific gravity, with the material having a higher specific gravity collecting further down the tube than a material having a lower specific gravity.

The filter tube 10 of this invention is inserted within an upper portion 58 of the centrifuge tube as shown in FIG. 1. The permeable materials 101 and 102 which pass through the filter 18 disposed in the bottom of the filter tube collect in a lower portion 59 of the centrifuge tube out of contact with the filter tube. The filter tube, which is also made of plastic, such as polypropylene, polycarbonate, or the like, includes a first cylindrical portion 11 having a length less than the length of the centrifuge tube and an outer diameter less than the inner diameter of the centrifuge tube. The first cylindrical portion 11 tapers inwardly from top to bottom and is adapted to slide easily within the upper portion of the centrifuge tube.

The filter tube further includes a second cylindrical portion or filter flange 12 having a larger outer diameter than the first cylindrical portion with a shoulder 13 formed between the first and second cylindrical portions. The filter flange 12 also has a larger outer diameter than the inner diameter of the centrifuge tube so that the shoulder 13 sits on top of the centrifuge flange 54 to position the filter tube in a predetermined position in the centrifuge tube. The cap 55 extending from the centrifuge tube is adapted to fit within an opening 14 in the top of the filter tube to seal the same. Further, the connecting member 56 is of a predetermined length so as to secure the filter tube in the predetermined position in the centrifuge tube when the cap seals the top of the filter tube. The cap includes a projecting tab 57 to facilitate removal of the cap. A pair of ears 15, 16 extend outwardly from the filter flange 12 to facilitate grasping of the filter tube while inserting or removing it from the centrifuge tube without contaminating the materials in the filter tube.

Figure 3:
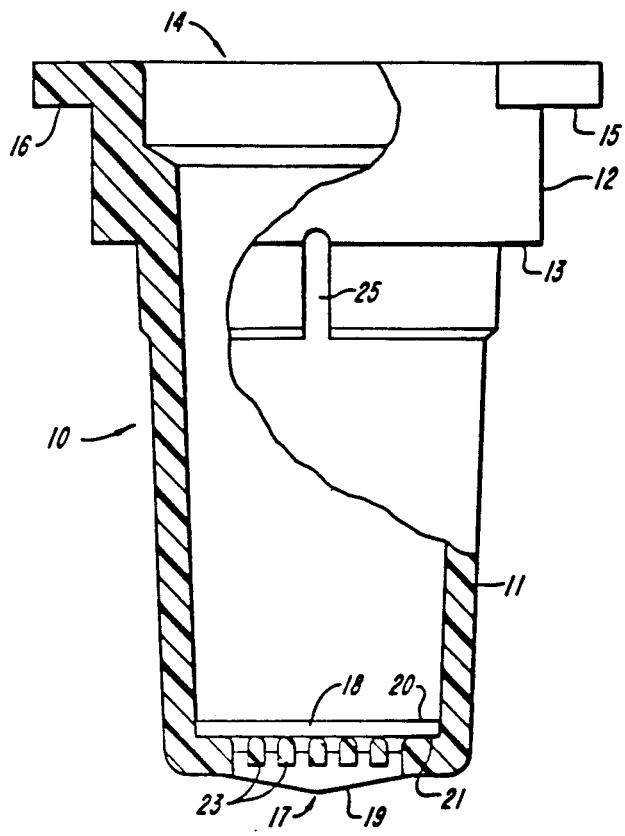
FIG. 3 is a side, partial sectional view of the filter tube of this invention.
Figure 4:
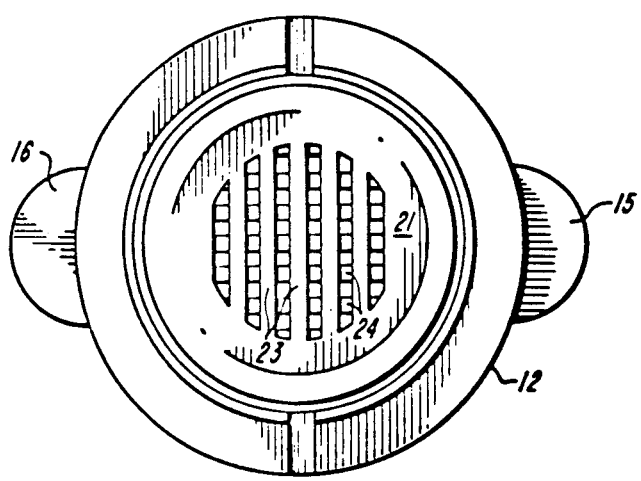
FIG. 4 is a top view of the filter tube of FIG. 3 with the filter 18 removed.
Figure 5:
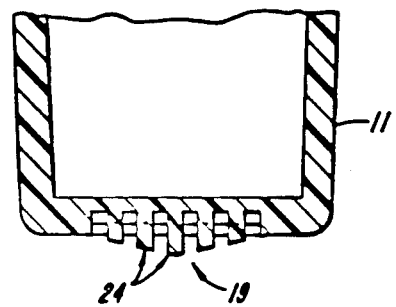
FIG. 5 is a side sectional view of the bottom of the filter tube of FIG. 3 with the filter 18 removed.

As shown in FIG. 3, the bottom of the filter tube includes a filter support means 17, a filter 18, and a shallow conical-shaped outer bottom surface 19. The filter 18 consists of any porous barrier means and is preferably a microporous plastic material. The filter support consists of a rectangular array or gridwork of openings formed by two perpendicularly disposed arrays of regularly spaced parallel bars 23, 24, disposed one on top of the other, as shown in FIG. 4. The filter 18 sits on top of the upper array of bars 23, having rounded top surfaces. The peripheral edge 20 of filter 18 rests on a peripheral shoulder 21 formed at the lower end of the filter tube and is sealed thereto to prevent liquids from passing around the edges of the filter. In a preferred example, both the filter and filter tube are formed of a plastic, such as polycarbonate, and the periphery of the filter 20 is heat sealed to the peripheral shoulder 21 of the filter tube. The filter support enables the filter to withstand the centrifugal force during spinning. The shallow conical-shaped bottom surface 19 of the filter tube is designed to promote the flow of permeable materials through the filter tube and to collect the last drop of liquid leaving the filter tube. This design facilitates the removal of all liquid from the filter tube and thus performs a "self-cleaning" function.

The filter tube further includes a groove 25 in the outer wall of the first cylindrical portion and extending into the filter flange which serves as a venting means to allow air to escape from the centrifuge tube as the permeable material filters through the filter tube.

As shown in FIG. 1, the dimensions of the filter tube and centrifuge tube are related in order to filter the maximum amount of material. It is desired to fill the filter tube with the maximum amount of material which the filter tube can hold without spilling out the top of the filter tube. This is determined by the angle of the tube holder slot and the length and inner dimensions of the filter tube. Further, when filtration is complete, the permeable material which has filtered through the filter tube into the centrifuge tube must not contact the filter tube so as to maintain the separation of the filterable material.

The separation of permeable from non-permeable materials by the filter is meant to include all types of separation, including the separation of solutes from solvents, one or more solutes from other solutes, colloids from solvents, and other particulate material from liquids. A typical use would be the separation of blood cells from other molecules dissolved in the water of the blood. Furthermore, the composite filter tube and centrifuge tube allows both separation by filtration through the filter tube into non-permeable materials retained within the filter tube and permeable materials collected in the centrifuge tube, and then the further separation of the permeable materials by specific gravity in the centrifuge tube. For example, a mixture of alcohol and napthalene with particulate matter could be separated such that the particulate matter remained in the filter tube with the alcohol and napthalene passing through the filter tube but being separated in the centrifuge tube with respect to their different specific gravities.

Figure 6:
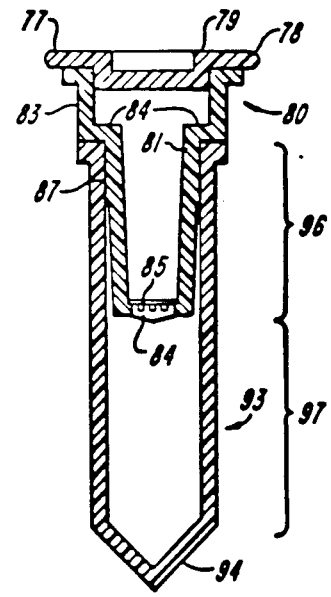
FIG. 6 is a side sectional view of a second embodiment of the filter tube of this invention inserted within a centrifuge tube.

In a second preferred embodiment shown in FIG. 6, the cover or cap 79 for the filter tube 80 is not attached to centrifuge tube 93. Otherwise, the filter tube and centrifuge tube are the same as in the first embodiment. The centrifuge tube 93 is a cylindrical tube of a first length which is closed at its lower end 94 and open at its upper end 95 and includes an upper portion 96 adjacent the upper end and a lower portion 97 adjacent the lower end. The filter tube 80 includes a cylindrical filter tube portion 81 of a second length less than the first length and is adapted to be fit in axial alignment within the upper portion 96 of the centrifuge tube and to close the open upper end of the centrifuge tube. The filter tube 80 has an opening 82 at its upper end. A second cylindrical portion 83 having an outer diameter greater than the inner diameter of the centrifuge tube 93 forms a shoulder 84 with tube portion 81. Shoulder 84 rests upon the top of centrifuge tube 93 for positioning the filter tube in a predetermined position within the centrifuge tube. Filter support means 84 are disposed at the lower end of the filter tube and a pressure filter 85 is retained in the lower end of the filter tube by the filter support means. A vent means provided by groove 86 formed in the outer wall of the filter tube allows air to escape from the centrifuge tube as permeable material passes through the filter. Filter tube 80 is preferably friction or interference fit within centrifuge tube 93 by providing tube 81 with an outer diameter for at least a portion of its length just slightly less than the inner diameter of centrifuge tube 93. Cap 79 comprises a friction fit or snap fit cover which seals the opening at the upper end of the filter tube. Projecting tabs 77, 78 are provided on the periphery of the cap 79 to facilitate removal of the cap.

Although certain preferred embodiments of the invention have hereinbefore been described, variations of the invention will be perceived by those skilled in the art, which variations are nevertheless in the scope of the invention as defined by the claims appended hereto.

What is claimed is:

1. A filter assembly for filtering materials by means of centrifugal force, said assembly comprising:
   a centrifuge tube comprising a cylindrical tube of a first length which is closed at a lower end and open at an upper end and including an upper portion adjacent the upper end and a lower portion adjacent the lower end, the centrifuge tube further including a flexible connecting member of a predetermined length and a cap, the connecting member being attached at one end to the centrifuge tube and at the other end to the cap;
   a cylindrical filter tube of a second length less than the first length adapted to be fit in axial alignment within the upper portion of the centrifuge tube and to seal the open upper end of the centrifuge tube, the filter having an opening at its upper end;
   the filter tube including a means for positioning the filter tube in a predetermined position within the upper portion of the centrifuge tube;
   the connecting member being adapted to secure the filter tube in the predetermined position in the centrifuge tube while the cap seals the opening at the upper end of the filter tube; and
   means for separating a predetermined amount of a mixture of permeable and nonpermeable materials placed in the filter tube when the composite assembly is spun in a centrifuge such that the nonpermeable materials are retained in the filter tube and the permeable materials which pass through the filter means are collected in the lower portion of the centrifuge tube including, filter means disposed at the lower end of the filter tube for separating permeable materials from nonpermeable material.

2. The filter assembly of claim 1, wherein the means for positioning the filter tube comprises a cylindrical flange on the upper end of the filter tube having a diameter larger than the internal diameter of the centrifuge tube so that the flange sits on the upper end of the centrifuge tube.

3. The filter assembly of claim 2, wherein the filter tube includes a pair of projecting ears extending from the flange for grasping the filter tube.

4. The filter assembly of claim 14, wherein the vent means comprises a groove on the outer surface of the filter tube connecting the interior of the centrifuge tube with the atmosphere.

5. The filter assembly of claim 1, wherein the filter means includes a support means disposed at the lower end of the filter tube and a pressure filter retained in the lower end of the filter tube by the support means.

6. The filter of claim 5, wherein the filter support means comprises an array of spaced perpendicularly disposed bars.

7. The filter assembly of claim 6, wherein the filter support means includes two arrays of parallel spaced bars which are perpendicularly disposed one above the other.

8. The filter assembly of claim 5, wherein the pressure filter is disposed within the filter tube on the filter support means, and the bottom of the filter tube includes a peripheral shoulder to which the periphery of the pressure filter is sealed to prevent liquid from escaping around the edges of the pressure filter.

9. The filter assembly of claim 8, wherein both the filter tube and the pressure filter are made of plastic and the periphery of the pressure filter is heat sealed to the filter tube.

10. The filter assembly of claim 1, wherein the bottom of the filter tube has a shallow conical shape to promote flow of the permeable material through the filter.

11. The filter assembly of claim 1, wherein the diameter of the filter tube is selected to provide a friction fit within the centrifuge tube.

12. The filter assembly of claim 1, wherein the centrifuge tube is made of plastic.

13. The filter assembly of claim 12, wherein the filter tube is made of plastic.

14. The filter assembly of claim 1, further comprising vent means for allowing air to escape from the centrifuge tube as the permeable material passes through the filer.

* * * * *